Figure 2:
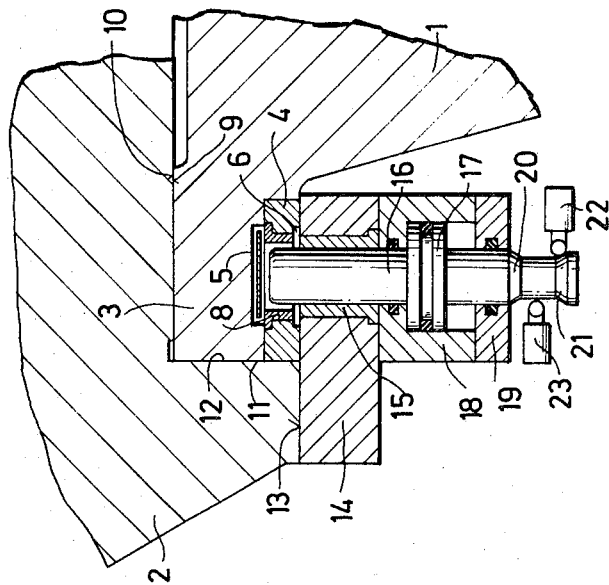

United States Patent [19]

Hof

[11] 3,710,660

[45] Jan. 16, 1973

[54] MACHINE TOOL

[75] Inventor: Rainer Hof, Niederfischback, Germany

[73] Assignee: Arn Jung Lokomotivfabrik GmbH

[22] Filed: July 16, 1970

[21] Appl. No.: 55,549

[30] Foreign Application Priority Data

July 17, 1969 Germany..................P 19 36 329.2

[52] U.S. Cl..................................82/2 D, 82/34 A
[51] Int. Cl................................................B23b 3/20
[58] Field of Search..............82/2 D, 34 A, 34 B, 24

[56] References Cited

UNITED STATES PATENTS 2,812,580  11/1957  Masinda..............................82/34 A

FOREIGN PATENTS OR APPLICATIONS 1,008,285  10/1965  Great Britain........................82/2 D Primary Examiner—Leonidas Vlachos
Attorney—Watson, Cole, Grindle & Watson

[57] ABSTRACT

Machine tool and method of shifting a base of the tool for adjustment in a perpendicular direction having stop strips on guide plates with a stop bolt for vertical adjustment with the bolt having a smaller diameter than the diameter of bores in the stop strips.

5 Claims, 5 Drawing Figures

PATENTED JAN 16 1973
3,710,660
SHEET 1 OF 2

INVENTOR.
Rainer Hof
BY
Watson, Cole, Grindle & Watson
Attys

MACHINE TOOL

This invention relates to machine tools with a base, which is guided in the manner of a carriage on a machine frame and which is adjustable as to height and serves as carrier of the actual tool carriage. Such a base offers the advantage that the positioning of the carriage can be adapted to the height of the pertinent workpieces, that is the carriage slidable perpendicularly, needs to be shifted forward from its starting position only by the height of the working surface of the workpiece.

In the case of machine tools with bases adjustable in height, the required working accuracy can only be achieved if the base in each of its working positions lies precisely parallel to the work table, and only in that case will the movement of the cutting tools be in parallel to the work table or in parallel to its axis, that is, in parallel to its rotational axis. For the shifting of the base there usually are two spindles which are driven by a motor. In order to assure in this case the parallel positioning of the carriage, it has been known to provide the proper installations in the lifting gear which permit a leveling of the base. It has furthermore been known to place the driving spindles of the base under a corresponding initial load in order to avoid, in this way, dislocations of the application of power giving rise to an oblique positioning of the base. The base is guided ordinarily along guide plates of the machine frame and, of course, such that a lifting off of the base from the frame perpendicularly to the direction of movement of the base, will be prevented. Hydraulically detachable spring elements have been known to be used for this purpose, by means of which the base is pressed against the guide surfaces of the machine frame. The friction achieved thereby counteracts at the same time any canting of the base.

As experience has shown, one cannot achieve a precise parallel positioning of the base in all its possible working positions with the known means, that is it cannot be achieved with the precision as required nowadays in the case of machine tools. It is the purpose of this invention to assure the precise parallel positioning of the base at its various levels of height. In this it starts out from the condideration that it will be sufficient whenever the base is capable of assuming a limited number of working positions, that is a limited number of levels of height.

According to the invention, a machine tool with a base adjustable perpendicularly on the machine frame, for example with the aid of two hydro cylinders, and which serves as a support of the tool carriage, is guided along guide plates of the machine frame in the manner of a carriage and carries guide plates on its rear side which together with the remaining guide surfaces of the base, encircle the guide plates of the machine frame in the manner of claws, and is developed in such a way that stop strips with bores lying one above the other perpendicularly, are attached on the rear side of the guide plates of the machine frame, and a stop bolt is inserted in every guide plate of the base whose axis is perpendicular to the guide plates.

In the case of numerically or programmed controlled machines, it is necessary to move the base again and again into the position with a precision up to 0.01 mm, in which the machine is programmed for a certain workpiece. This will be achieved by the invention.

Also the invention permits the fastening of the base precisely parallel to the work table of the machine tool in the postiions given by way of the bores of the stop strip, and in the same manner as though the base were fastened and screwed in with the aid of setting pins on the machine stand. The invention, however, also offers the opportunity of shifting the base mechanically and fastening it at the proper level of height mechanically on the machine stand because the diameter of the stop bolt is smaller than the diameter of the bores in the stop strips and because only the lower jacket surface of the stop bolt is utilized for the fastening of the base. Such a fastening of the base will suffice since a shifting of the base counter to its weight through its driving means, for example through the hydro cylinder, will be prevented. The hydro cylinders press the base firmly onto the jacket surface. A change in the positioning of the base by outside forces is impossible.

In the case of shifting of the base, be that during lifting or lowering, one will proceed according to the invention in such a way that the base will be lifted first by a small amount and simultaneously with that the stop bolts will be pulled out of the bore holes of the stop strips, thus subsequently the base will be shifted in the desired direction and then stopped whenever the lower jacket surface of the stop bolt lies at a somewhat higher level than the lower jacket surface of the desired bore holes of the stop strips. The stop bolts are then inserted in the pertinent bore holes and the base thereupon is lowered to such an extent that the stop bolts will rest on the lower jacket surfaces of the pertinent bore holes of the stop strips. In order to be able to carry out the change in positioning of the base automatically, two terminal switches are assigned to every stop bolt, furthermore a switch has been attached on a guide plate of the base which is operated by way of notches applied to a stop strip and, furthermore, a second time-relay has been provided which controls the lowering movement of the base after the stop bolt has been moved into one of the bore holes of the strips.

Figure 1:
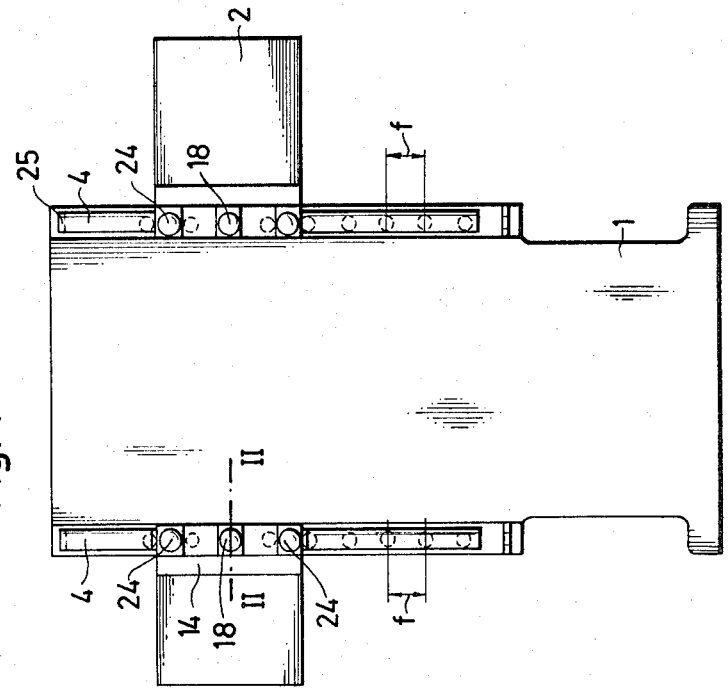
Figure 5:
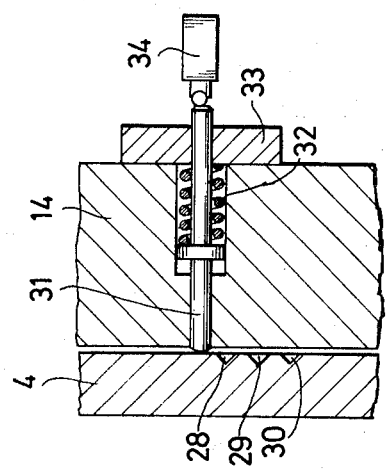
Figure 4:
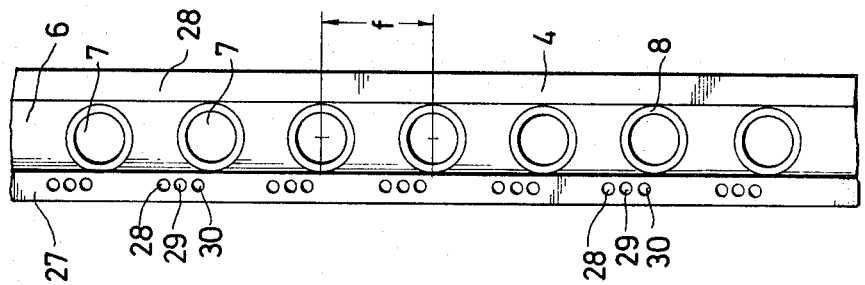
Figure 3:
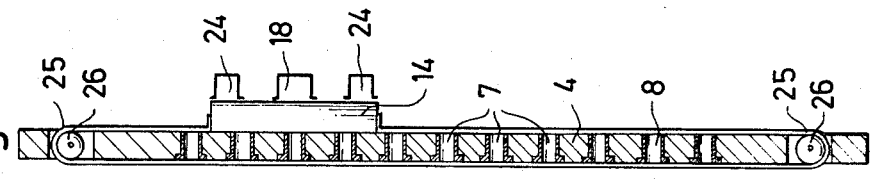

Further objects of the invention will be apparent from the following description when considered in connection with the accompanying drawings in which;

FIG. 1 is a rear view of a machine frame with a base guided in the manner of a carriage at its front side, FIG. 2 is a cross-section through one of the two guide systems of the base on the machine frame taken on line II—II of FIG. 1, FIG. 3 is a longitudinal section through a stop strip according to the invention, FIG. 4 is a front elevation of the strip, and FIG. 5 is a cross-section of a part of the stop strip and of the guide plate of the base with a switch inserted in said base.

FIG. 1 shows the rear of the machine frame 1 of a machine tool in schematic presentation, for example of a vertical turning lathe, whose rotatable work table is covered up by the machine stand. A base 2 is guided in the manner of a carriage on the machine frame and is thus adjustable in its level of height in relation to the work level of the machine. The machine frame 1 forms a guide plate 3 on each side for the guidance of base 2, FIG. 2. On the rear side of each guide plate 3 there is attached a stop strip 4 which in its cross section is rectangular and its fastening is accomplished by means of screws that have not been shown, in connection with adjusting pins.

Below every stop strip 4, plate 3 has a recess 5. An equivalent recess 6 is in the stop strip 4 at its surface. A relatively large number of bores 7 is made in every stop surface, into which bores hardened bushings 8 are inserted from the direction of the rear side of the stop strips. The stop strips intended for the two plates 3 are produced simultaneously, so that the bores 7 of both strips will have the same spacing f. If therefore, the two stop strips are attached in precisely the same position on the machine frame, then the bores 7 or their axes will lie precisely parallel to the work table of the machine tool.

The front side of machine frame 1 constitutes a guide surface 9 for the rear side 10 of base 2 on each side. Said base abuts furthermore with a surface 11, which is perpendicular to the surface 10, against the front surface 12 of plates 3. Guide plate 14, which encircles in the manner of claws, plate 3 inclusive of the stop strip 4 together with surfaces 10 and 11 is threaded onto the front surface 13 of the base which lies in the same plane as the surface of the stop strip 4.

Plate 14 which in the design given by way of example, has the same height as base 2 and has three superposed bore holes, the middle bore of which receives a hardened bushing 15. In this bushing a stop bolt 16 is guided the diameter of which is smaller than the inside diameter of the bushings 7. The stop bolt carries a piston 17 which slides in cylinder 18 and which is covered up by a lid 19. Compression oil for adjustment of the stop bolt can be fed according to choice to the two cylinder chambers of the double acting cylinder. Otherwise, the bolt is guided through lid 19 and has for the purpose of control two terminal switches 22 and 23 actuated by its two control surfaces 20 and 21. Of these two, in the terminal position of the stop bolt shown in FIG. 2, switch 22 is switched on and switch 23 is switched off. In the other terminal position of piston 17, the switch positions are reversed.

As FIG. 3 shows, two additional housings 24 have been placed above or below cylinder 18 on plate 14. These housings encompass spring elements, known per se, and being hydraulically detachable, with the aid of which the base can be pressed against the guide part 10 of machine frame 1.

On the upper and lower front surfaces of plate 14, a band 25 is attached to be moved by means of rollers 26 which are mounted at the lower and upper ends of stop strip 4 in notches of the strip. Band 25 runs in notches 6 of the stop strip and in recess 5 of plate 3, and it will cover up bores 7 of the stop strip which each time are not in use.

In front of each bore 7, three stop holes 28, 29 and 30 are provided in one of the peripheral flanges 27 and 28. A spring loaded pin 31 is mounted slidably in plate 14 and in a bore of said plate. Its spring is designated by 32. It is supported by a plate 33, that is to say spring 32 presses bolt 31 against flange 27 of stop strip 4. In addition, a switch 34 is attached to plate 14 which is switched on and off by pin 31. Switch 34 is switched off as soon as the pin reaches one of the recesses 28, 29 or 30.

If base 2 is intended to be moved from a certain operating position into a higher or lower one, such may be accomplished in the following manner:

The desired direction of movement of base 2 is selected at a switch point of the machine and then an operating switch is pushed in. The pushing in of this switch causes the spring elements which are housed in housing 24 to be detached. The base is lifted by a small amount in the slow speed drive independently of the desired direction of movement so that stop bolts 16 become disengaged, that is, they no longer transfer the weight of the base on the machine frame, and during the same movement stop bolts 16 are pulled out of bushings 8. At the same time, switches 22, 23 are shifted, that is, switch 23 is switched on and switch 22 is switched off. This causes the base to be lifted or lowered in the desired direction of movement with a customary speed of feed. The movement of the base continues for the length of time that the operating switch is depressed. Prior to crossing each bore 7 in the stop strips 4, the three stops 28, 29 and 30 are crossed, that is, switch 34 is switched off and on. But as long as the operating switch is depressed this will not influence the movement. Before reaching bore 7, switch 34 will be switched off upon reaching stop 29 or stop 30 depending on the direction of movement of the base and in the case of release of the operating switch. This results in the movement from this time on being accomplished by the slow speed drive and the movement being switched off upon reaching the middle stop 29. In this position stop bolt 16 is in such position that its axis coincides with the central axis of bore 7, switch 34 as a result thereof being switched off causes the stop bolt to be moved hydraulically into bore 7. At the same time, switch 23 is switched off and switch 22 is switched on. This as a consequence, causes the drive of the base in the slow speed drive to be switched to lowering and this lowering movement takes place only to the point that the stop bolt 16 rests on the lower jacket surface of bore 7.

I claim:

1. Machine tool comprising a machine frame, a base adjustable on the machine frame in a perpendicular direction, the base serving as a carrier for a tool carriage and being guided in the manner of a carriage on guide plates of the machine frame and having guide plates on its rear side which together with remaining guide surfaces of the base encircle the guide plates of the machine frame, stop strips provided on the guide plates with bores superposed in the perpendicular, a stop bolt inserted in each guide plate of the base having its axis perpendicular to the guide plates, the diameter of the bolt being smaller than the diameter of the bores of the stop strip and being shiftable in the direction of its axis.

2. Machine tool according to claim 1, in which the stop bolts each carry a piston which is slidable in a cylinder and serve at the same time for the adjustment of terminal switches.

3. Machine tool according to claim 1, in which a spring loaded operating pin for a terminal switch is provided inserted in one of the guide plates of the base and having three recesses for each bore of a stop strip, of which each one recess causes an operation of the terminal switch so that the outside ones will cause an operation of the switch in the sense that the movement of the base is slowed and the central one that the base is stopped.

4. Machine tool according to claim 1, in which rollers are provided mounted in recesses on each end of each stop strip a band is wound around the rollers and the stop strip, the ends of the band being connected with a guide plate of the base.

5. Machine tool according to claim 1, in which spring loaded and hydraulically detachable spring elements are provided on each guide plate of the base which serve to press the base against guide paths of the machine frame.

* * * * *